United States Patent
Katano et al.

(10) Patent No.: US 8,563,191 B2
(45) Date of Patent: Oct. 22, 2013

(54) FUEL CELL SYSTEM AND GAS LEAKAGE DETECTION DEVICE

(75) Inventors: Koji Katano, Toyota (JP); Keigo Suematsu, Susono (JP); Nobuhiro Tomosada, Kodaira (JP)

(73) Assignee: Totota Jidosha Kabushiki Kaisha, Toyota-Shi (JP)

( * ) Notice: Subject to any disclaimer, the term of this patent is extended or adjusted under 35 U.S.C. 154(b) by 1285 days.

(21) Appl. No.: 11/989,579

(22) PCT Filed: Jul. 26, 2006

(86) PCT No.: PCT/JP2006/315257
§ 371 (c)(1),
(2), (4) Date: Jan. 28, 2008

(87) PCT Pub. No.: WO2007/013667
PCT Pub. Date: Feb. 1, 2007

(65) Prior Publication Data
US 2010/0151343 A1 Jun. 17, 2010

(30) Foreign Application Priority Data
Jul. 27, 2005 (JP) .................................. 2005-217129

(51) Int. Cl.
*H01M 8/04* (2006.01)
*H01M 8/24* (2006.01)

(52) U.S. Cl.
USPC ............ 429/444; 429/446; 429/455; 429/456

(58) Field of Classification Search
USPC ........... 429/90, 429, 431, 442, 413, 415, 444, 429/446, 455, 456; 73/49.2, 40
See application file for complete search history.

(56) References Cited

U.S. PATENT DOCUMENTS

2003/0077495 A1* 4/2003 Scartozzi et al. ................ 429/25
2003/0175566 A1* 9/2003 Fisher et al. ..................... 429/22
(Continued)

FOREIGN PATENT DOCUMENTS

DE 103 54 440 A1 7/2004
JP 09-022711 A 1/1997
(Continued)

OTHER PUBLICATIONS

Machine translation of: JP 2002/352824 A, Miyakubo, A., Dec. 6, 2002.*

(Continued)

*Primary Examiner* — Kenneth Douyette
(74) *Attorney, Agent, or Firm* — Kenyon & Kenyon LLP

(57) ABSTRACT

A fuel cell system according to one aspect of the invention is operated in an ordinary mode and in a gas leakage detection mode. The fuel cell system includes fuel cells, a fuel gas supplier configured to supply a fuel gas to the fuel cells, a shutoff valve provided in a flow path for leading a flow of the fuel gas supply from the fuel gas supplier to the fuel cells and configured to shut off the fuel gas supply, and a variable pressure regulator provided in the flow path between the shutoff valve and the fuel cells to regulate a pressure of the fuel gas in a downstream in a flow direction of the fuel gas supply to a variable pressure value. In the ordinary mode, the fuel cell system sets the pressure value of the variable pressure regulator to an ordinary power generation pressure value for ordinary power generation. In the gas leakage detection mode, on the other hand, the fuel cell system closes the shutoff valve, sets the pressure value of the variable pressure regulator to a higher value than the ordinary power generation pressure value, and performs leakage detection of the fuel gas from the shutoff valve. Such setting of the pressure value in the variable pressure regulator desirably enables high-speed reduction of the fuel gas pressure in the flow path between the shutoff valve and the variable pressure regulator.

7 Claims, 4 Drawing Sheets

(56) References Cited

U.S. PATENT DOCUMENTS

| | | | |
|---|---|---|---|
| 2004/0067399 A1* | 4/2004 | Kobayashi et al. | 429/25 |
| 2004/0099048 A1 | 5/2004 | Miura et al. | |
| 2005/0112428 A1* | 5/2005 | Freeman et al. | 429/22 |

FOREIGN PATENT DOCUMENTS

| | | |
|---|---|---|
| JP | 2000-274311 A | 10/2000 |
| JP | 2002-352824 A | 12/2002 |
| JP | 2003-308865 A | 10/2003 |
| JP | 2003-308868 A | 10/2003 |
| JP | 2004-170321 A | 6/2004 |
| JP | 2004-192919 A | 7/2004 |
| JP | 2006-092860 A | 4/2006 |
| JP | 2006-210055 A | 8/2006 |

OTHER PUBLICATIONS

Machine translation of: JP 2003/308868 A, Ino et al., Oct. 31, 2003.*

* cited by examiner

Pk3 : Low-Pressure Section Pressure Value
(Pressure Value Set in Variable
Low Pressure Regulator 220)
I : Power Generation Current

In State of Detection of Hydrogen Leakage

Pk3 : Low-Pressure Section Pressure Value
(Pressure Value Set in Variable
Low Pressure Regulator 220)

I : Power Generation Current

Px : Pressure Value Set in Variable Low Pressure Regulator 220
at the End of Ordinary Power Generation Pn : Leakage Detection Reference Value

FUEL CELL SYSTEM AND GAS LEAKAGE DETECTION DEVICE

This is a 371 national phase application of PCT/JP2006/315257 filed 26 Jul. 2006, which claims priority of Japanese Patent Application No. 2005-217129 filed 27 Jul. 2005, the contents of which are incorporated herein by reference.

TECHNICAL FIELD

The present invention relates to a technique of detecting a leakage of a fuel gas from a shutoff valve, which is constructed to shut off the flow of the fuel gas supplied from a gas supplier in a fuel cell system.

BACKGROUND ART

Fuel cells consuming a fuel gas (hereafter also referred to as anode gas), such as hydrogen, and oxygen to generate electric power have lately been noted as the novel energy source. In a fuel cell system equipped with such fuel cells, regulators (pressure regulators) are used to lower the pressure of an anode gas supply from a high-pressure anode gas supplier (for example, a hydrogen tank) to an adequate pressure level and then introduce the pressure-regulated anode gas to the fuel cells. The gas supplier is equipped with a shutoff valve (supplier shutoff valve) to allow and stop the supply of the anode gas. The anode gas is flowed from the gas supplier to the fuel cells through a flow path called an anode gas supply conduit. The gas supplier and the fuel cells are respectively located on an upstream side and on a downstream side of the anode gas supply conduit. Among the regulators located in the downstream of the supplier shutoff valve, a most upstream regulator is called a high pressure regulator.

For the safety measure, gas leakage detection is conventionally performed to check any leakage of the anode gas from the supplier shutoff valve. A typical procedure of the gas leakage detection reduces the pressure in a preset flow path section of the anode gas supply conduit (hereafter referred to as the leakage detection flow path) located in the downstream of the supplier shutoff valve and the high pressure regulator and detects a leakage of the anode gas from the supplier shutoff valve with a pressure sensor provided in the downstream of the high pressure regulator in the leakage detection flow path. The pressure reduction is required to lower the pressure in the upstream of the high pressure regulator to a level substantially equivalent to the pressure in the downstream of the high pressure regulator in the leakage detection flow path. The gas leakage detection is performed not with a pressure sensor provided in the upstream of the high pressure regulator but with a pressure sensor provided in the downstream of the high pressure regulator. This is because the pressure sensor located in the upstream of the high pressure regulator is required to have high pressure resistance and accordingly has relatively low pressure measurement accuracy.

A typical procedure of the pressure reduction for the gas leakage detection causes power generation of the fuel cells to consume the anode gas, after closure of the supplier shutoff valve as disclosed in Japanese Patent Laid-Open No. 2003-308868.

A relatively large amount of the anode gas is the target of pressure reduction of lowering the pressure in the upstream of the high pressure regulator to the level substantially equivalent to the pressure in the downstream of the high pressure regulator in the leakage detection flow path. The conventional method of consuming the anode gas by the simple power generation of the fuel cells as in the cited document, however, takes a relatively long time. One possible measure against this drawback causes power generation of the fuel cells under a high pressure to quickly consume the anode gas in the leakage detection flow path and attain high-speed pressure reduction. This, however, causes supply of large electric power to a secondary battery or another destination of consuming the generated electric power and leads to another drawback of poor durability of the secondary battery or another destination.

DISCLOSURE OF THE INVENTION

There would thus be a demand for providing a technique of enabling high-speed adequate pressure reduction in the leakage detection flow path in the course of detection of a gas leakage from the supplier shutoff valve in the fuel cell system.

In order to achieve at least part of the above demands, one aspect of the invention pertains to a fuel cell system equipped with fuel cells. The fuel cell system is operated at least in an ordinary mode for ordinary power generation of the fuel cells and in a gas leakage detection mode for detection of a leakage of a fuel gas. The fuel cell system has: a fuel gas supplier configured to supply the fuel gas to the fuel cells; a shutoff valve provided in a flow path for leading a flow of the fuel gas supply from the fuel gas supplier to the fuel cells and configured to shut off the fuel gas supply; a variable pressure regulator provided in the flow path between the shutoff valve and the fuel cells to regulate a pressure of the fuel gas in a downstream in a flow direction of the fuel gas supply to a variable pressure value; and a first variable pressure regulator controller configured to set the pressure value of the variable pressure regulator to an ordinary power generation pressure value for the ordinary power generation in the ordinary mode.

The fuel cell system further includes: a shutoff valve controller configured to close the shutoff valve in the gas leakage detection mode; a second variable pressure regulator controller configured to set the pressure value of the variable pressure regulator to a higher value than the ordinary power generation pressure value, after closure of the shutoff valve; and a gas leakage detector configured to perform leakage detection of the fuel gas from the shutoff valve, after setting of the higher pressure value in the variable pressure regulator.

The fuel cell system of this configuration enables high-speed reduction of the pressure of the fuel gas in the upstream of the variable pressure regulator on the flow path in the flow direction of the fuel gas supply in the course of leakage detection of the fuel gas from the shutoff valve. This arrangement desirably shortens the time required for the leakage detection of the fuel gas from the shutoff valve.

In one preferable application of this aspect of the invention, the fuel cell system further has a low-pressure power generation controller configured to cause the fuel cells to perform low-pressure power generation in the gas leakage detection mode.

In the fuel cell system of this application, the low-pressure power generation enables higher-speed reduction of the pressure of the fuel gas in the upstream of the variable pressure regulator on the flow path in the flow direction of the fuel gas supply in the course of leakage detection of the fuel gas from the shutoff valve. This arrangement further shortens the time required for the leakage detection of the fuel gas from the shutoff valve.

In another preferable application of the above aspect of the invention, the fuel cell system further has: a high pressure regulator provided in an upstream of the variable pressure regulator on the flow path in the flow direction of the fuel gas supply to regulate the pressure of the fuel gas supply to a preset pressure value; and a pressure sensor configured to measure a pressure between the variable pressure regulator and the high pressure regulator on the flow path. When the pressure measured by the pressure sensor decreases below the preset pressure value of the high pressure regulator after setting of the higher pressure value in the variable pressure regulator in the gas leakage detection mode by the second variable pressure regulator controller, the gas leakage detector performs the leakage detection of the fuel gas from the shutoff valve with referring to the pressure measured by the pressure sensor.

The fuel cell system of this application performs the leakage detection of the fuel gas from the shutoff valve based on the pressure measured by the pressure sensor.

In still another preferable application of the above aspect of the invention, the fuel cell system further has a high pressure regulator provided in an upstream of the variable pressure regulator on the flow path in the flow direction of the fuel gas supply to regulate the pressure of the fuel gas supply to a preset pressure value. The variable pressure regulator and the high pressure regulator are integrally formed as one pressure regulator.

The fuel cell system of this application attains a high volume ratio of a section of the flow path in the downstream of the variable pressure regulator to a section of the flow path between the variable pressure regulator and the high pressure regulator. This arrangement enables higher-speed reduction of the pressure of the fuel gas between the variable pressure regulator and the high pressure regulator on the flow path and thus further shortens the time required for the leakage detection of the fuel gas from the shutoff valve.

In order to achieve at least part of the demands described above, another aspect of the invention pertains to a gas leakage detection device for detecting a gas leakage. The gas leakage detection device is adopted in a fuel cell system, which is operated at least in an ordinary mode for ordinary power generation of fuel cells and in a gas leakage detection mode for detection of a leakage of a fuel gas. The fuel cell system has: a fuel gas supplier configured to supply the fuel gas to the fuel cells; a shutoff valve provided in a flow path for leading a flow of the fuel gas supply from the fuel gas supplier to the fuel cells and configured to shut off the fuel gas supply; a variable pressure regulator provided in the flow path between the shutoff valve and the fuel cells to regulate a pressure of the fuel gas in a downstream in a flow direction of the fuel gas supply to a variable pressure value; and a first variable pressure regulator controller configured to set the pressure value of the variable pressure regulator to an ordinary power generation pressure value for the ordinary power generation in the ordinary mode.

The gas leakage detection device includes: a shutoff valve controller configured to close the shutoff valve in the gas leakage detection mode; a second variable pressure regulator controller configured to set the pressure value of the variable pressure regulator to a higher value than the ordinary power generation pressure value, after closure of the shutoff valve; and a gas leakage detector configured to perform leakage detection of the fuel gas from the shutoff valve, after setting of the higher pressure value in the variable pressure regulator.

The gas leakage detection device of this configuration enables high-speed reduction of the pressure of the fuel gas in the upstream of the variable pressure regulator on the flow path in the flow direction of the fuel gas supply in the course of leakage detection of the fuel gas from the shutoff valve. This arrangement desirably shortens the time required for the leakage detection of the fuel gas from the shutoff valve.

The technique of the invention is not restricted to the fuel cell system or the gas leakage detection device described above but is also attainable by a gas leakage detection method or a control method of the fuel cell system. The invention is also actualized by diversity of other applications. Examples of possible application include computer programs for attaining the fuel cell system, the gas leakage detection device, and the corresponding methods, recording media in which such computer programs are recorded, and data signals that include such computer programs and are embodied in carrier waves.

In the applications of the invention as the computer programs and the recording media in which the computer programs are recorded, the invention may be given as a whole program to control the operations of the fuel cell system or the gas leakage detection device or as a partial program to exert only the characteristic functions of the invention.

BEST MODES OF CARRYING OUT THE INVENTION

One mode of carrying out the invention is described below in the following sequence with reference to the accompanied drawings:

A. Embodiment
A1. General System Configuration
A2. Hydrogen Leakage Detection
B. Modifications

A. EMBODIMENT

A1. General System Configuration

Figure 1:
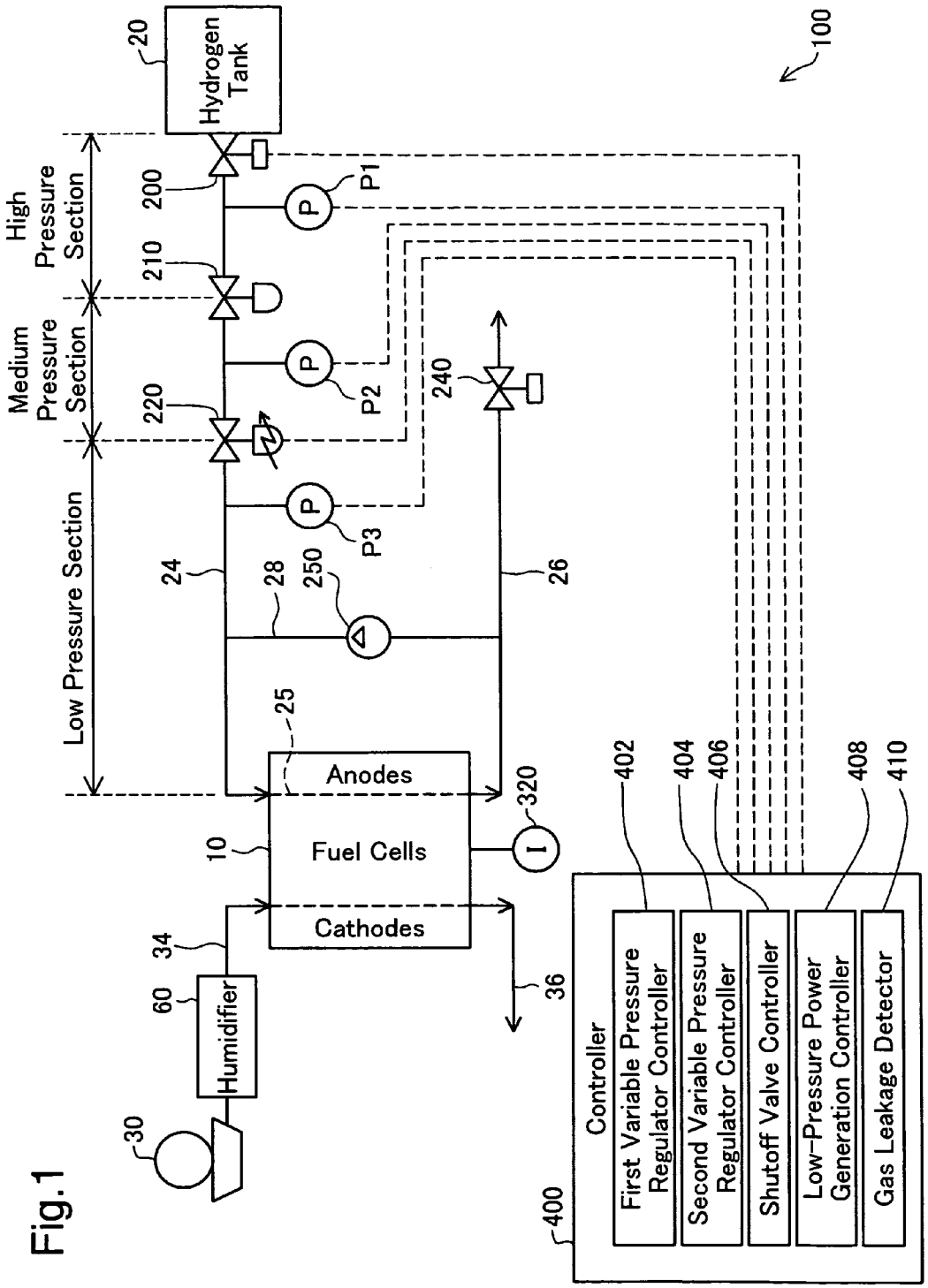
FIG. 1 is a block diagram schematically illustrating the configuration of a fuel cell system 100 in one embodiment of the invention.

FIG. 1 is a block diagram schematically illustrating the configuration of a fuel cell system 100 in one embodiment of the invention. The fuel cell system 100 mainly includes fuel cells 10, a hydrogen tank 20, a shutoff valve 200, a high pressure regulator 210, a variable low pressure regulator 220, pressure sensors P1, P2, and P3, a current sensor 320, a blower 30, a controller 400, a humidifier 60, and a circulation pump 250.

In the fuel cell system 100 of the embodiment, the shutoff valve 200 is checked for any abnormality at the operation stop time of the fuel cell system 100 after ordinary power generation of the fuel cells 10. The abnormality checking process closes the shutoff valve 200 and detects the occurrence of any hydrogen leakage from the shutoff valve 200. This process is hereafter referred to as the hydrogen leakage detection process.

The fuel cells 10 are polymer electrolyte fuel cells and are arranged to have a stack structure of multiple unit cells (not shown). Each unit cell has a hydrogen electrode (anode) and an oxygen electrode (cathode) arranged across an electrolyte membrane (none of these components is shown). A hydrogen-containing fuel gas (anode gas) is fed to the anodes of the respective unit cells, whereas an oxygen-containing oxidizing gas is fed to the cathodes of the respective fuel cells. The electrochemical reaction of the fuel gas with the oxidizing gas then proceeds to generate electric power as the electromotive force in the fuel cells 10. The fuel cells 10 supply the generated electric power to a specific load (for example, a motor or an accumulator) connecting with the fuel cells 10. The fuel cells 10 are not restricted to the polymer electrolyte fuel cells but may be any of various other fuel cells, for example, hydrogen membrane fuel cells, alkali fuel cells, phosphate fuel cells, or molten carbonate fuel cells. The anode gas flows through an anode flow path 25 formed in the fuel cells 10.

The anode flow path 25 in the fuel cells 10 is connected with an anode off gas conduit 26, which is equipped with a purge valve 240. During the operation of the fuel cell system 100, an exhaust gas from the anode after the electrochemical reaction or an anode off gas flows through the anode off gas conduit 26 and is purged out at regular intervals by the purge valve 240.

A gas circulation flow path 28 is located in the upstream of the purge valve 240 in the discharge flow direction of the anode off gas and connects the anode off gas conduit 26 to an anode gas supply conduit 24. The circulation pump 250 is provided on the gas circulation flow path 28. The gas circulation flow path 28 leads the anode off gas pressure-fed by the circulation pump 250 to the anode gas supply conduit 24. The gas circulation flow path 28 works to circulate the anode off gas in this manner. The remaining hydrogen contained in the anode off gas is circulated and is recycled as the anode gas for power generation.

The blower 30 works to supply the air as the oxidizing gas to the cathodes of the fuel cells 10. The blower 30 is connected to the cathodes of the fuel cells 10 via a cathode gas supply conduit 34. The humidifier 60 is provided on the cathode gas supply conduit 34. The air compressed by the blower 30 is humidified by the humidifier 60 and is supplied to the fuel cells 10. A cathode off gas conduit 36 is formed in the fuel cells 10. An exhaust gas from the cathode after the electrochemical reaction or a cathode off gas flows through the cathode off gas conduit 36 and is discharged out.

The hydrogen tank 20 is a reservoir for storage of high-pressure hydrogen gas and is connected to the anode flow path 25 in the fuel cells 10 via the anode gas supply conduit 24. The shutoff valve 200, the high pressure regulator 210, and the variable low pressure regulator 220 are arranged on the anode gas supply conduit 24 in this sequence from the side closer to the hydrogen tank 20.

The shutoff valve 200 is closed to shut off the supply of the hydrogen gas from the hydrogen tank 20 to the anode gas supply conduit 24 and is opened to allow the supply of the hydrogen gas from the hydrogen tank 20 to the anode gas supply conduit 24.

The high pressure regulator 210 regulates the high pressure of the hydrogen gas fed from the hydrogen tank 20 to a preset pressure value Q. This pressure value Q is adequately set according to the configuration of the fuel cell system 100.

The variable low pressure regulator 220 further regulates the pressure of the hydrogen gas regulated by the high pressure regulator 210 to a variable pressure value. The controller 400 (described later) controls the variable low pressure regulator 220 to perform variable regulation of the pressure of the hydrogen gas. The details of the variable regulation will be described later.

A flow path section of the anode gas supply conduit 24 between the shutoff valve 200 and the high pressure regulator 210 has a higher pressure level in the anode-related flow paths. This flow path section is accordingly called a high pressure section (see FIG. 1). A flow path section of the anode gas supply conduit 24 between the high pressure regulator 210 and the variable low pressure regulator 220 is called a medium pressure section (see FIG. 1). The medium pressure section is located in the downstream of the high pressure regulator 210 and accordingly has a lower pressure than the high pressure section. A flow path section of the anode gas supply conduit 210 in the downstream of the variable low pressure regulator 220 in the flow direction of the hydrogen gas supply is called a low pressure section (see FIG. 1). The low pressure section is located in the downstream of the variable low pressure regulator 220 and accordingly has a lower pressure than the medium pressure section.

The pressure sensors P1, P2, and P3 are respectively provided in the high pressure section, the medium pressure section, and the low pressure section of the anode gas supply conduit 24 as shown in FIG. 1. A gas leakage detector 410 (described later) receives measured pressure values (Pa: Pascal) from these pressure sensors P1, P2, and P3. The pressure values measured by the pressure sensors P1, P2, and P3 are respectively expressed as a high-pressure section pressure value Pk1, a medium-pressure section pressure value Pk2, and a low-pressure section pressure value Pk3. The high-pressure section pressure value Pk1, the medium-pressure section pressure value Pk2, and the low-pressure section pressure value Pk3 are respectively assumed as representative pressure values in the high pressure section, the medium pressure section, and the low pressure section.

The pressure sensor P1 is located in the high pressure section exposed to the extremely high pressure and is thus designed to have high pressure resistance but relatively low pressure measurement accuracy. The pressure sensor P2 is located in the medium pressure section exposed to the lower pressure than the pressure of the high pressure section and is thus designed to have the higher pressure measurement accuracy but the lower pressure resistance than the pressure sensor P1.

The current sensor 320 is attached to the fuel cells 10. The controller 400 (described below) receives a measured value of electric current I caused by power generation of the fuel cells 10 (A: ampere, hereafter referred to as power generation current I) from the current sensor 320.

The controller 400 is constructed as a microcomputer-based logic circuit and includes a CPU that executes series of processing and operations according to preset control programs, a ROM that stores control data and the control programs required for the various operations executed by the CPU, a RAM that temporarily stores diverse data required for the various operations executed by the CPU in readable and writable manner, and input and output ports that take charge of input and output of diverse signals. The controller 400 functions as a first variable pressure regulator controller 402 in the state of ordinary power generation (ordinary mode), while functioning as a second variable pressure regulator controller 404, a shutoff valve controller 406, a low-pressure power generation controller 408, and a gas leakage detector 410 in the state of detection of hydrogen leakage (gas leakage detection mode).

In the state of ordinary power generation (ordinary mode) of the fuel cell system 100, the first variable pressure regulator controller 402 is activated to adequately regulate the pressure value of the variable low pressure regulator 220 in response to an external load demand (power generation request). When the power generation request demands an increased output of generated electric power (power generation current), the first variable pressure regulator controller 402 regulates the pressure value of the variable low pressure regulator 220 to a high level in response to the increased output demand. Such pressure regulation increases the flow rate of the hydrogen gas flowing through the low pressure section of the anode gas supply conduit 24.

Figure 2:
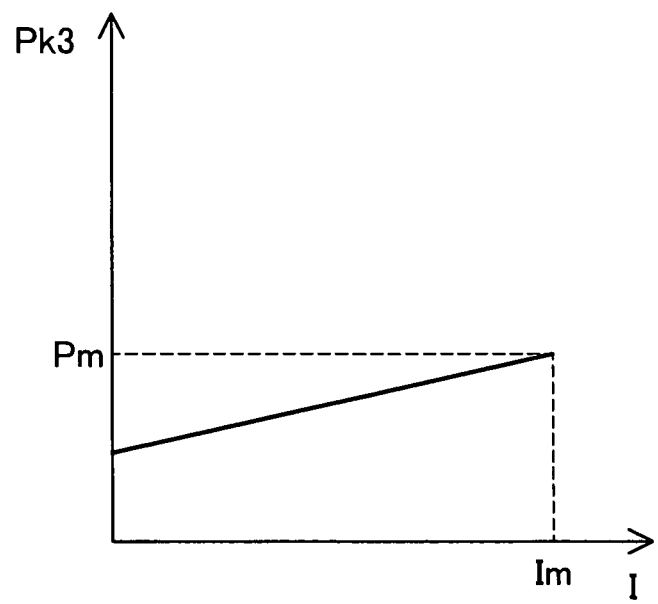
FIG. 2 is a graph showing a variation in low-pressure section pressure value Pk3 against power generation current I in response to a variation of a pressure value set in a variable low pressure regulator 220 in the state of ordinary power generation of the fuel cell system 100 of FIG. 1.

FIG. 2 is a graph showing a variation in low-pressure section pressure value Pk3 against the power generation current I in response to a variation of the pressure value set in the variable low pressure regulator 220 in the state of ordinary power generation of the fuel cell system 100 of FIG. 1. Regulation of the pressure value set in the variable low pressure regulator 220 by the first variable pressure regulator controller 402 causes a variation in low-pressure section pressure value Pk3. The power generation current I varies substantially in proportion to the low-pressure section pressure value Pk3. In the state of ordinary power generation, a current value Im represents a maximum power generation current Im, and a pressure value Pm represents a maximum ordinary pressure value that is the pressure value set in the variable low pressure regulator 220 to give the maximum power generation current Im.

In the description hereof, a pressure value Px represents the pressure value set in the variable low pressure regulator 220 at the end of ordinary power generation of the fuel cells 10. Namely the low-pressure section pressure value Pk3 is equal to the pressure value Px at the end of ordinary power generation of the fuel cells 10.

The controller 400 functions as the first variable pressure regulator controller 402 in the state of ordinary power generation (in the ordinary mode). The function of the first variable pressure regulator controller 402 outputs driving signals to the respective constituents of the fuel cell system 100, for example, the blower 30, the humidifier 60, the shutoff valve 200, the circulation pump 250, and the purge valve 240, to control the operations of these constituents according to the overall operation status of the fuel cell system 100, while regulating the variable pressure value in the variable low pressure regulator 220.

The controller 400 functions as the second variable pressure regulator controller 404, the shutoff valve controller 406, the low-pressure power generation controller 408, and the gas leakage detector 410 in the state of detection of hydrogen leakage (in the gas leakage detection mode). The combined functions of the second variable pressure regulator controller 404, the shutoff valve controller 406, the low-pressure power generation controller 408, and the gas leakage detector 410 control the respective constituents of the fuel cell system 100, while receiving the measured pressure values from the pressure sensors P1, P2, and P3 and performing hydrogen leakage detection of the shutoff valve 200.

A2. Hydrogen Leakage Detection

Figure 3:
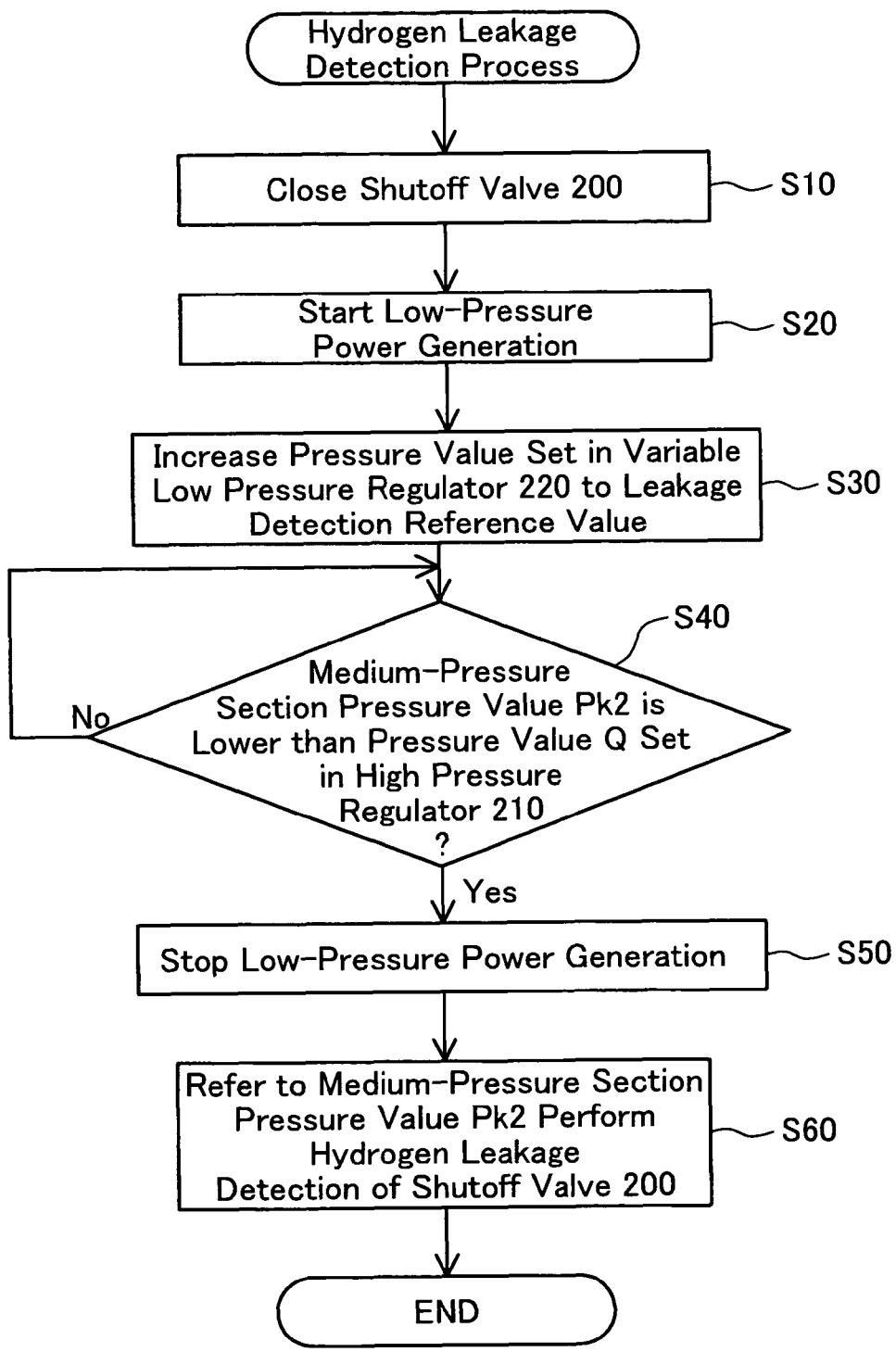
FIG. 3 is a flowchart showing a hydrogen leakage detection process executed in the fuel cell system 100 of FIG. 1.

FIG. 3 is a flowchart showing the hydrogen leakage detection process executed in the fuel cell system 100 of FIG. 1. The hydrogen leakage detection process of the embodiment closes the shutoff valve 200 to detect the occurrence of any hydrogen leakage from the shutoff valve 200 at the operation stop time of the fuel cell system 100 after ordinary power generation.

On the start of the hydrogen leakage detection process (FIG. 3), the shutoff valve controller 406 first closes the shutoff valve 200 (step S10).

The low-pressure power generation controller 408 then controls the respective constituents of the fuel cell system 10 to start power generation of the fuel cells 10 (step S20). This operation reduces the hydrogen gas pressures in the medium pressure section and the high pressure section of the anode gas supply conduit 24. The power generation in this state is hereafter referred to as low-pressure power generation.

The second variable pressure regulator controller 404 subsequently sets the pressure value of the variable low pressure regulator 220 to a predetermined reference pressure value Pn (hereafter also referred to as leakage detection reference value Pn) (step S30).

Figure 4:
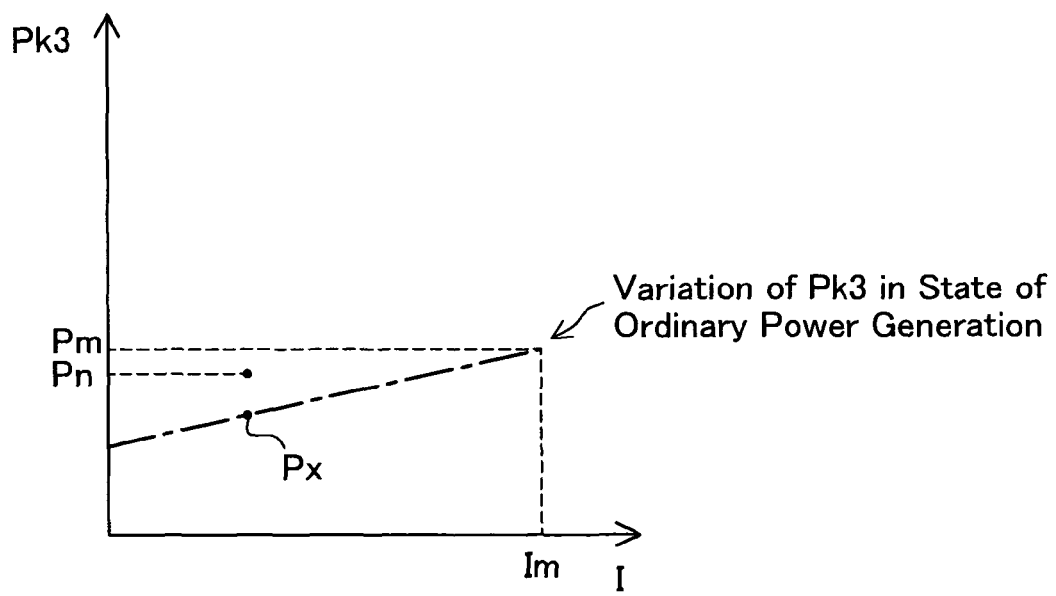
FIG. 4 is a graph showing a variation in low-pressure section pressure value Pk3 in response to the setting of the pressure value of the variable low pressure regulator 220 to a leakage detection reference value at step S30 in the hydrogen leakage detection process of FIG. 3.

FIG. 4 is a graph showing a variation in low-pressure section pressure value Pk3 in response to the setting of the pressure value of the variable low pressure regulator 220 to the leakage detection reference value Pn at step S30 in the hydrogen leakage detection process of FIG. 3. The leakage detection reference value Pn set at step S30 is higher than the pressure value Px of the variable low pressure regulator 220 at the end of ordinary power generation. In response to the setting of the pressure value of the variable low pressure regulator 220 to the leakage detection reference value Pn by the second variable pressure regulator controller 404, the low-pressure section pressure value Pk3 increases over the pressure value Px at the end of ordinary power generation as shown in the graph of FIG. 4.

The gas leakage detector 410 receives the measured medium-pressure section pressure value Pk2 from the pressure sensor P2 and determines whether the measured medium-pressure section pressure value Pk2 is lower than the pressure value Q set in the high pressure regulator 210 (step S40). The decrease of the measured medium-pressure section pressure value Pk2 below the pressure value Q set in the high pressure regulator 210 means that the high pressure section and the medium pressure section are exposed to substantially equivalent pressures.

When the measured medium-pressure section pressure value Pk2 is not lower than the pressure value Q set in the high pressure regulator 210 (step S40: no), that is, when the pressure in the high pressure section is still higher than the pressure in the medium pressure section, the gas leakage detector 410 waits until the decrease of the medium-pressure section pressure value Pk2 below the pressure value Q set in the high pressure regulator 210.

When the measured medium-pressure section pressure value Pk2 is lower than the pressure value Q set in the high pressure regulator 210 (step S40: yes), that is, when the pressure in the high pressure section is substantially equivalent to the pressure in the medium pressure section, on the other hand, the gas leakage detector 410 controls the respective constituents of the fuel cell system 100 to stop the low-pressure power generation of the fuel cells (step S50).

After the pressure in the high pressure section decreases to be substantially equivalent to the pressure in the medium pressure section, the gas leakage detector 410 refers to the measured medium-pressure section pressure value Pk2 received from the pressure sensor P2 and performs hydrogen leakage detection of the shutoff valve 200 (step S60). In this state, the anode flow path 25 has an extremely high pressure loss, so that the anode gas supply conduit 24 (all of the high pressure section, the medium pressure section, and the low pressure section) can be assumed as a closed space.

The procedure of hydrogen leakage detection is described in detail. The gas leakage detector 410 receives the measured medium-pressure section pressure value Pk2 from the pressure sensor P2 after stop of the low-pressure power generation and waits for a predetermined time period. The gas leakage detector 410 again receives the measured medium-pressure section pressure value Pk2 from the pressure sensor P2 after elapse of the predetermined time period. The gas leakage detector 410 calculates the absolute value of a difference between the previous medium-pressure section pressure value Pk2 and the current medium-pressure section pressure value Pk2 after elapse of the predetermined time period. When the calculated absolute value of the difference is greater than a preset threshold value, the gas leakage detector 410 detects the occurrence of hydrogen leakage from the shutoff valve 200, that is, some abnormality in the shutoff valve 200. The hydrogen leakage from the shutoff valve 200 may be failed shutoff of the hydrogen flow from the hydrogen tank 20 to the anode gas supply conduit 24 or leakage of the hydrogen gas from the shutoff valve 200 to the outside. When the calculated absolute value of the difference is not greater than the preset threshold value, on the other hand, the gas leakage detector 410 detects no-occurrence of hydrogen leakage from the shutoff valve 200, that is, no abnormality in the shutoff valve 200. After the detection of either the occurrence or no-occurrence of hydrogen leakage, the gas leakage detector 410 terminates the hydrogen leakage detection.

In the hydrogen leakage detection process of the embodiment shown in FIG. 3, the second variable pressure regulator controller 404 sets the pressure value in the variable low pressure regulator 220 (the low-pressure section pressure value Pk3) to the leakage detection reference value Pn, which is higher than the pressure value Px of the variable low pressure regulator 220 at the end of ordinary power generation (step S30). This setting is, however, not restrictive. When a reference pressure regulation range of the variable low pressure regulator 220 in the state of ordinary power generation is PL<Pk3<PH (PL=minimum reference pressure value, PH=maximum reference pressure value), one modification of hydrogen leakage detection may set the leakage detection reference value Pn to be higher than the maximum reference pressure value PH.

In the fuel cell system 100 of the embodiment described above, after closure of the shutoff valve 200, the hydrogen leakage detection process (FIG. 3) sets the pressure value of the variable low pressure regulator 220 to the higher value than the pressure value Px at the end of ordinary power generation and accordingly increases the low-pressure section pressure value Pk3 over the pressure value Px. This enables high-speed reduction of the hydrogen gas pressures in the medium pressure section and the high pressure section of the anode gas supply conduit 24 and quickly lowers the medium-pressure section pressure value Pk2 in the medium pressure section below the pressure value Q set in the high pressure regulator 210. The quick pressure reduction desirably shortens the time required for hydrogen leakage detection of the shutoff valve 200. This process also enables easy detection of hydrogen leakage in the low pressure section since the pressure in the low pressure section is increased.

In the fuel cell system 100 of the embodiment, the hydrogen leakage detection process (FIG. 3) starts the low-pressure power generation, while setting the pressure value of the variable low pressure regulator 220 to the higher value than the pressure value Px at the end of ordinary power generation and accordingly increasing the low-pressure section pressure value Pk3 over the pressure value Px. The low-pressure power generation leads to high-speed reduction of the hydrogen gas pressures in the medium pressure section and the high pressure section of the anode gas supply conduit 24. This quickly lowers the medium-pressure section pressure value Pk2 in the medium pressure section below the pressure value Q set in the high pressure regulator 210 and desirably shortens the time required for hydrogen leakage detection of the shutoff valve 200.

In the fuel cell system 100 of the embodiment, the hydrogen leakage detection process (FIG. 3) performs the hydrogen leakage detection of the shutoff valve 200 not using the high-pressure section pressure value Pk1 measured by the pressure sensor P1 but using the medium-pressure section pressure value Pk2 measured by the pressure sensor P2 after the decrease of the pressure in the high pressure section to the level substantially equivalent to the pressure in the medium pressure section. The pressure sensor P2 has the higher pressure measurement accuracy than the pressure sensor P1 as mentioned previously. This process accordingly improves the accuracy of the hydrogen leakage detection of the shutoff valve 200 (step S60 in FIG. 3).

B. MODIFICATIONS

The embodiment discussed above is to be considered in all aspects as illustrative and not restrictive. There may be many modifications, changes, and alterations without departing from the scope or spirit of the main characteristics of the present invention.

B1. Modified Example 1

The fuel cell system 100 of the embodiment includes the two regulators, the high pressure regulator 210 and the variable low pressure regulator 220. The technique of the invention is, however, not restricted to the fuel cell system of this configuration, but the high pressure regulator 210 and the variable low pressure regulator 220 may be replaced by one integral regulator ZZ (not shown). The regulator ZZ internally has a medium pressure area corresponding to the medium pressure section of the anode gas supply conduit 24 shown in FIG. 1. This configuration attains a high volume ratio of the low pressure section of the anode gas supply conduit 24 to the internal medium pressure area of the regulator ZZ. In the hydrogen leakage detection process (FIG. 3), the high volume ratio enables higher-speed reduction of the hydrogen gas pressures in the internal medium pressure area of the regulator ZZ and in the high pressure section of the anode gas supply conduit 24.

In the fuel cell system 100 of the embodiment, the high pressure regulator 210 may be arranged in parallel with the variable low pressure regulator 220. This configuration attains a high volume ratio of the low pressure section to the medium pressure section in the anode gas supply conduit 24. In the hydrogen leakage detection process (FIG. 3), the high volume ratio enables higher-speed reduction of the hydrogen gas pressures in the medium pressure section and the high pressure section of the anode gas supply conduit 24.

B2. Modified Example 2

The fuel cell system 100 of the embodiment uses the hydrogen tank 20 as the supply source of hydrogen gas. This structure is, however, not essential. One modified structure without the hydrogen tank 20 produces hydrogen through a reforming reaction of an adequate material, for example, an alcohol, a hydrocarbon, or an aldehyde, and supplies the produced hydrogen to the anode flow path 25 in the fuel cells 10 via the shutoff valve 200.

B3. Modified Example 3

In the fuel cell system 10 of the embodiment, another shutoff valve YY (not shown) may be provided at any position in the downstream of the pressure sensor P2 on the anode gas supply conduit 24 in the flow direction of the hydrogen gas supply (see FIG. 1). In this modified structure, the hydrogen leakage detection process (FIG. 3) closes the shutoff valve YY after the processing of step S50 and performs the hydrogen leakage detection of the shutoff valve 200 at step S60. A hydrogen gas leakage at any position in the downstream of the shutoff valve YY on the anode gas supply conduit 24 in the flow direction of the hydrogen gas supply or a hydrogen gas leakage from the inside of the fuel cells 10 does not affect the result of hydrogen leakage detection of the shutoff valve 200. This modified structure thus ensures the accurate hydrogen leakage detection of the shutoff valve 200.

B4. Modified Example 4

The fuel cell system 100 of the embodiment uses only two regulators for regulation of the hydrogen gas pressure, that is, the high pressure regulator 210 and the variable low pressure regulator 220. This configuration is, however, not restrictive, but the technique of the invention is also applicable to a fuel cell system having three or more regulators. For example, an additional regulator may be provided in the low pressure section of the anode gas supply conduit 24. This arrangement further facilitates pressure regulation of the hydrogen gas supplied to the fuel cells 10.

B5. Modified Example 5

In the fuel cell system 100 of the embodiment, the first variable pressure regulator controller 402 and the second variable pressure regulator controller 404 may be designed to control the variable low pressure regulator 220 by means of the air pressure. The first variable pressure regulator controller 402 and the second variable pressure regulator controller 404 adjust the air pressure fed to the variable low pressure regulator 220 and accordingly regulate the pressure value of the variable low pressure regulator 220.

B6. Modified Example 6

In the hydrogen leakage detection process (FIG. 3) executed in the fuel cell system 100 of the embodiment, the gas leakage detector 410 performs the hydrogen leakage detection of the shutoff valve 200 with referring to the medium-pressure section pressure value Pk2 measured by the pressure sensor P2. This process is, however, not restrictive. In one modified flow of the hydrogen leakage detection process (FIG. 3), the gas leakage detector 410 receives the measured low-pressure section pressure value Pk3 from the pressure sensor P3 and determines whether the low-pressure section pressure value Pk3 is lower than the leakage detection reference value Pn of the variable low pressure regulator 220, instead of the processing of step S40. When the low-pressure section pressure value Pk3 is lower than the leakage detection reference value Pn of the variable low pressure regulator 220, that is, when the pressure levels are substantially equalized in the low pressure section, the medium pressure section, and the high pressure section of the anode gas supply conduit 24, the gas leakage detector 410 stops the low-pressure power generation (step S50) and performs the hydrogen leakage detection of the shutoff valve 200 with referring to the low-pressure section pressure value Pk3, instead of the processing of step S60. This modified process performs the hydrogen leakage detection of the shutoff valve 200 with the pressure sensor P3 for the lower pressure, in place of the pressure sensor P2. This arrangement desirably increases the accuracy of the hydrogen leakage detection.

B7. Modified Example 7

In the fuel cell system 100 of the embodiment, the high pressure regulator 210 regulates the pressure of the hydrogen gas supplied from the hydrogen tank 20 to the fixed pressure value Q. This is, however, not essential. Like the variable low pressure regulator 220, the high pressure regulator 210 may be replaced by a variable high pressure regulator PP (not shown). In this modified structure, after the processing of step S30 in the hydrogen leakage detection process (FIG. 3), the second variable pressure regulator controller 404 may set the pressure value of the variable high pressure regulator PP to be higher than the fixed pressure value Q of the high pressure regulator 210. This modification enables higher-speed reduction of the hydrogen gas pressure in the high pressure section of the anode gas supply conduit 24 and thereby further shortens the time required for hydrogen leakage detection of the shutoff valve 200.

B8. Modified Example 8

In the controller 400 of the embodiment, the functions attained by the software configuration may be constructed as the hardware configuration. Alternatively the functions constructed by the hardware configuration may be attained by the software configuration.

B9. Modified Example 9

In the hydrogen leakage detection process of the embodiment (FIG. 3), the leakage detection reference value Pn used at step S30 may be set to be higher than the maximum ordinary pressure value Pm (see FIG. 2). Compared with the setting in the hydrogen leakage detection process of the embodiment, such modified setting enables higher-speed reduction of the hydrogen gas pressures in the medium pressure section and the high pressure section of the anode gas supply conduit 24 and more quickly lowers the medium-pressure section pressure value Pk2 in the medium pressure section below the pressure value Q set in the high pressure regulator 210. The quicker pressure reduction further shortens the time required for hydrogen leakage detection of the shutoff valve 200.

B10. Modified Example 10

The embodiment adopts a variable regulator for the variable pressure regulator. The variable regulator is, however, not essential but may be replaced by an injector.

As explained previously, the variable regulator is a pressure reducing valve to lower the pressure of a gas supplied from a primary source. The regulator has two spaces parted by a diaphragm coupled with a valve element. One of the two spaces is constructed as a flow path to allow transmission of a target gas (for example, anode gas) as an object of pressure regulation from the primary source to a secondary side. The other space is constructed as a pressure regulating chamber to introduce a driving gas (for example, the air) for actuation of the diaphragm from an inlet. The pressure value of the target gas is regulated by changing the supply pressure of the driving gas.

The injector is an on-off electromagnetic valve to be controlled on and off according to, for example, the duty ratio of supplied control pulses.

The invention claimed is:

1. A fuel cell system equipped with fuel cells,
the fuel cell system being operated at least in a gas leakage detection mode for detection of a leakage of a fuel gas, the fuel cell system comprising:
a fuel gas supplier configured to supply the fuel gas to the fuel cells;
a shutoff valve provided in a flow path for leading a flow of the fuel gas supply from the fuel gas supplier to the fuel cells and configured to shut off the fuel gas supply;
a variable pressure regulator provided in the flow path between the shutoff valve and the fuel cells to regulate a pressure of the fuel gas in a downstream in a flow direction of the fuel gas supply to a variable pressure value;
a high pressure regulator provided in an upstream of the variable pressure regulator on the flow path in the flow direction of the fuel gas supply to regulate the pressure of the fuel gas supply to a preset pressure value,
a first pressure sensor configured to measure a pressure between the variable pressure regulator and the high pressure regulator on the flow path;
a shutoff valve controller configured to close the shutoff valve in the gas leakage detection mode;
a variable pressure regulator controller configured to set the pressure value of the variable pressure regulator to a higher value than a previous pressure value prior to setting of the gas leakage detection mode, after closure of the shutoff valve; and
a gas leakage detector configured to perform leakage detection of the fuel gas from the shutoff valve with reference to the pressure measured by the first pressure sensor, after setting of the higher pressure value in the variable pressure regulator;
wherein when the pressure measured by the first pressure sensor decreases below the preset pressure value regulated by the high pressure regulator, the gas leakage detector is programmed to perform the leakage detection of the fuel gas from the shutoff valve with reference to the pressure measured by the first pressure sensor.

2. The fuel cell system in accordance with claim 1, the fuel cell system further comprising:
a low-pressure power generation controller configured to cause the fuel cells to perform low-pressure power generation in the gas leakage detection mode.

3. The fuel cell system in accordance with claim 1, wherein the variable pressure regulator and the high pressure regulator are integrated with each other.

4. The fuel cell system in accordance with claim 1, wherein multiple variable pressure regulators are located between the shutoff valve and the fuel cells on the flow path,
the variable pressure regulator controller sets a pressure value in each of the multiple variable pressure regulators to a higher value than a previous pressure value prior to setting of the gas leakage detection mode, after closure of the shutoff valve.

5. The fuel cell system in accordance with claim 1, wherein the variable pressure regulator controller sets the pressure value of the variable pressure regulator to a higher value than a latest pressure value immediately before setting of the gas leakage detection mode, after closure of the shutoff valve.

6. The fuel cell system in accordance with claim 1, wherein the variable pressure regulator controller sets the pressure value of the variable pressure regulator to a higher value than a maximum ordinary pressure value of the variable pressure regulator, after closure of the shutoff valve.

7. The fuel cell system in accordance with claim 1, wherein the variable pressure regulator is at least one of a variable regulator and an injector.

* * * * *

UNITED STATES PATENT AND TRADEMARK OFFICE
CERTIFICATE OF CORRECTION

PATENT NO.        : 8,563,191 B2                                                      Page 1 of 1
APPLICATION NO.  : 11/989579
DATED             : October 22, 2013
INVENTOR(S)       : Katano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

Signed and Sealed this
Fifteenth Day of September, 2015

Michelle K. Lee
*Director of the United States Patent and Trademark Office*